March 25, 1952     D. P. DURHAM     2,590,238
TRAILER BRAKE OPERATING LINK
Filed Oct. 11, 1948
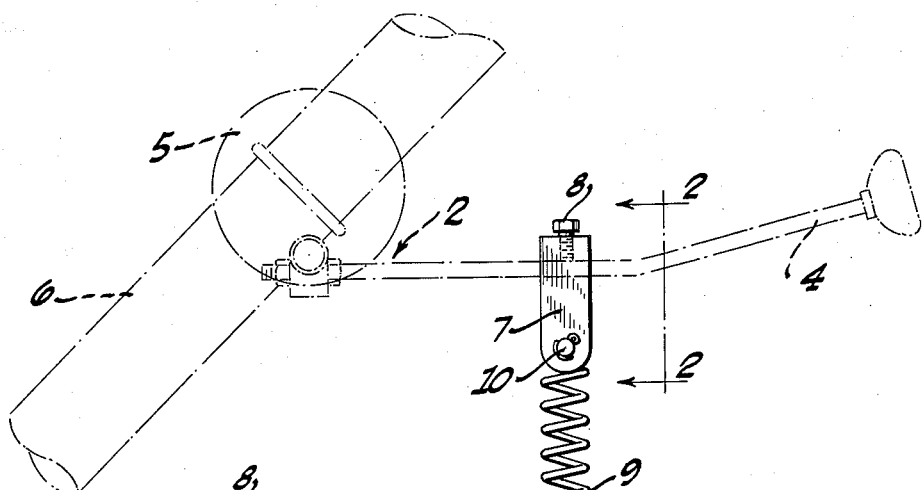
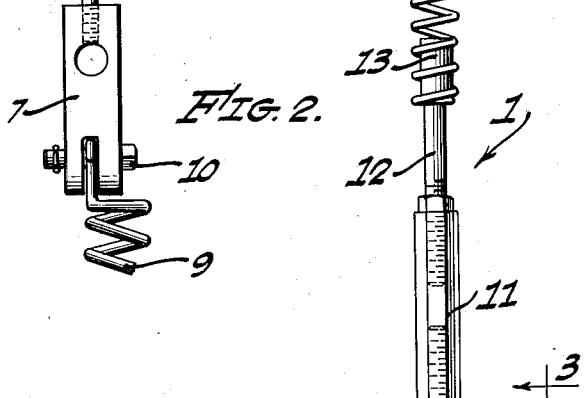
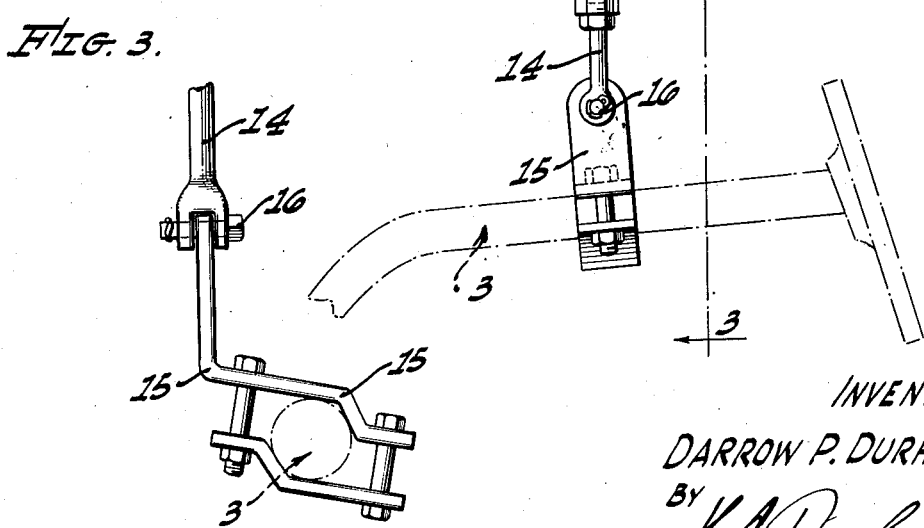
INVENTOR.
DARROW P. DURHAM,
BY
ATTORNEY.

Patented Mar. 25, 1952

2,590,238

UNITED STATES PATENT OFFICE 2,590,238

TRAILER BRAKE OPERATING LINK

Darrow P. Durham, Long Beach, Calif.

Application October 11, 1948, Serial No. 53,871

3 Claims. (Cl. 74—582)

This invention relates to a trailer brake operating link, whereby the trailer brakes are simultaneously operating with or prior to the automobile brakes which is towing the trailer. The trailer brakes are operated when the foot brake pedal in the automobile is used.

An object of my invention is to provide a novel trailer brake operating link, which causes the trailer brakes to be operated each time that the automobile foot brake is depressed and requires no further attention of the driver.

A feature of my invention resides in the fact that the vehicle operator may use his arm and hand for signaling at the same time that the brakes are applied.

Another feature of my invention is to provide a novel trailer brake operating link which will permit proper use of the foot brake pedal, even though the trailer brake unit has been moved its maximum distance.

Another feature of my invention is to provide a novel trailer brake operating link which may be adjusted so that the trailer brake unit may be operated before or simultaneously with the vehicle brakes.

Other objects, advantages and features of invention may appear from the accompanying drawing, the subjoined detailed description, and the appended claims.

In the drawing—

Figure 1 is a side elevation of my operating link, illustrating its operating position.

Figure 2 is a fragmentary view taken in the direction of line 2—2 in Figure 1.

Figure 3 is a fragmentary side view taken from line 3—3 in Figure 1.

Referring more particularly to the drawing, my trailer brake operating link 1, is mounted between the trailer brake operating unit 2, and the foot brake pedal 3. The trailer brake operating unit 2, includes an operating handle 4, which controls the operating unit 5, attached to the steering column 6.

The link 1 includes a clamp 7, which is fixedly attached to the handle 4 by means of the set screw 8. A coil spring 9 is secured at one end to the clamp 7, by suitable means, such as the pin 10.

A turn buckle or threaded sleeve 11 includes a rod 12, which screws into the turn buckle. The rod 12 is formed with a head 13, which fits within the spring 9, and is slidable longitudinally within the spring. A second threaded rod or clevis 14 screws into the sleeve or turn buckle 11, and this clevis is attached to the bottom clamp 15 by suitable means, such as the pin 16.

The clamp 15 is securely attached to the brake pedal 3, and moves with this brake pedal as it is operated. Forward movement of the brake pedal 3 will cause a downward pull on the operating link 1, which will move the handle 4 downwardly, thus simultaneously operating the trailer brake unit 5.

The spring 9 will permit further movement of the brake pedal 3 after the handle 4 has reached its maximum throw. If it is desired to operate the handle 4 independently this can be done and at this time the spring 9 will slide downwardly over the threaded rod 12 and without interfering with the position of the turn buckle 11 or the pedal 3. By adjusting the length of the turn buckle 11, it is possible to adjust the length of the control link, thus determining the throw of the handle 4 with a particular inward movement of the brake pedal 3.

Having described my invention, I claim:

1. An operating link for trailer brakes consisting of a clamp, a set screw threaded into the clamp, a second clamp, bolts on the second clamp fixedly securing the second clamp to a brake pedal of a car, an elongated coil spring, means securing one end of said spring to the first named clamp, a rod, a pin extending through the lower end of the rod and through the second clamp to pivotally secure the rod to said second clamp, a head on the upper end of said rod fitted in the coils of said spring and slidable within the spring whereby said rod may move longitudinally in the spring.

2. An operating link for trailer brakes consisting of a clamp, a set screw threaded into the clamp, a second clamp, bolts on the second clamp fixedly securing the second clamp to a brake pedal of a car, an elongated coil spring, means securing one end of said spring to the first named clamp, a rod, a pin extending through the lower end of the rod and through the second clamp to pivotally secure the rod to said second clamp, a head on the upper end of said rod fitted in the coils of said spring and slidable within the spring whereby said rod may move longitudinally in the spring, a threaded sleeve threaded on to said rod to provide a turn buckle thereon.

3. An operating link for trailer brakes including a clamp, a set screw threaded into the clamp, an elongated helical spring, a pin extending through said clamp and the upper end of said spring to secure said spring to the clamp, a second clamp, lock bolts on the second clamp fixedly securing said second clamp to a brake pedal of a car, a turn buckle including upper and lower rods, a pin extending through the lower rod and through the second clamp to pivotally attach said rod to the second clamp, a head on the upper end of said rod, said rod being slidable within the spring and allowing longitudinal movement of the second rod within said spring.

DARROW P. DURHAM.

REFERENCES CITED

The following references are of record in the file of this patent:

UNITED STATES PATENTS

| Number | Name | Date |
|---|---|---|
| 346,771 | Phillips | Aug. 3, 1886 |
| 449,015 | Underhill | Mar. 24, 1891 |
| 537,346 | Maag | Apr. 9, 1895 |
| 974,649 | Fishburne | Nov. 1, 1910 |
| 1,801,987 | Strand | Apr. 21, 1931 |
| 2,008,727 | Sanford | July 23, 1935 |
| 2,452,599 | Paulus | Nov. 2, 1948 |
| 2,458,845 | Gardner | Jan. 11, 1949 |
| 2,504,729 | Rojan | Apr. 18, 1950 |